(12) United States Patent  
Depierri et al.

(10) Patent No.: US 8,047,228 B2
(45) Date of Patent: Nov. 1, 2011

(54) METERING SYSTEM AND USE THEREOF

(75) Inventors: Robert Gail Depierri, Baton Rouge, LA (US); Ronald Francis Mire, Port Allen, LA (US); John Louis Meng, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 641 days.

(21) Appl. No.: 11/064,638

(22) Filed: Feb. 23, 2005

(65) Prior Publication Data

US 2006/0185740 A1    Aug. 24, 2006

(51) Int. Cl.
*B29C 47/68* (2006.01)

(52) U.S. Cl. .................. 137/547; 137/550; 251/315.16; 422/131

(58) Field of Classification Search .................. 137/547, 137/550; 251/208–209, 315.01, 315.16; 422/131

See application file for complete search history.

(56) References Cited

U.S. PATENT DOCUMENTS

| | | | | |
|---|---|---|---|---|
| 229,384 A * | 6/1880 | Crocker | .................. | 210/398 |
| 2,786,504 A * | 3/1957 | Samler | .................. | 137/547 |
| 3,012,024 A | 12/1961 | Kavesh | | |
| 3,167,398 A * | 1/1965 | Whittington | .................. | 422/131 |
| 3,542,337 A * | 11/1970 | Scaramucci | .................. | 251/209 |
| 3,826,281 A | 7/1974 | Clark | | |
| 3,846,394 A | 11/1974 | Mitacek | .................. | 260/93.7 |
| 3,883,113 A * | 5/1975 | Kolb | .................. | 251/209 |
| 4,123,601 A | 10/1978 | Kellum et al. | .................. | 526/79 |
| 4,351,727 A * | 9/1982 | Brogger | .................. | 210/411 |
| 4,524,946 A * | 6/1985 | Thompson | .................. | 251/88 |
| 4,610,574 A | 9/1986 | Peters | .................. | 406/50 |
| 4,687,381 A | 8/1987 | Dumain et al. | .................. | 406/52 |
| 4,767,028 A | 8/1988 | Rohlfing et al. | .................. | 222/219 |
| 4,773,565 A * | 9/1988 | Rohlfing et al. | .................. | 137/240 |
| 4,774,299 A | 9/1988 | Dumain et al. | .................. | 526/64 |
| 5,181,539 A * | 1/1993 | Yokoyama | .................. | 137/625.32 |
| 5,205,533 A * | 4/1993 | Berchem | .................. | 251/118 |
| 5,240,683 A | 8/1993 | Maurel et al. | .................. | 422/135 |
| 5,361,801 A | 11/1994 | Kerpan et al. | | |
| 5,433,924 A * | 7/1995 | Sagar et al. | .................. | 422/131 |
| 5,467,796 A * | 11/1995 | Pettinaroli et al. | .................. | 137/238 |

(Continued)

FOREIGN PATENT DOCUMENTS

DE    3816736    11/1989

(Continued)

*Primary Examiner* — Craig Schneider
*Assistant Examiner* — Andrew J Rost
(74) *Attorney, Agent, or Firm* — Frank E. Reid; Robert L. Abdon; Kevin M. Faulkner

(57) ABSTRACT

This invention relates to a valve assembly comprising (a) a valve body defining a valve chamber, an inlet port and a discharge port, wherein the inlet port and discharge port communicate with the valve chamber; and (b) a valve member in the valve chamber, the valve member comprising a passage having (1) a first opening and (2) a second opening housing a filter having an inlet surface proximate to the inlet port and a discharge surface proximate to the discharge port, wherein the passage communicates with the inlet port and discharge port, and wherein the valve member is moveable to alternately juxtapose the inlet port and either the filter inlet surface or the filter discharge surface. The invention further relates to a particulate material metering and/or feed system comprising the valve assembly.

8 Claims, 3 Drawing Sheets

U.S. PATENT DOCUMENTS 5,693,727 A * 12/1997 Goode et al. .................... 526/86
5,851,493 A     12/1998 Lawson et al. ................ 422/131
6,319,995 B2   11/2001 Glenn et al. .................... 526/64

FOREIGN PATENT DOCUMENTS

FR          1548290           12/1968
GB          2309063            7/1997
JP          56028358 A  *      3/1981

* cited by examiner

METERING SYSTEM AND USE THEREOF

FIELD OF THE INVENTION

This invention relates to a valve assembly with a filter in a valve passage and a method of using the valve assembly in a metering system and/or feed system in a chemical process.

BACKGROUND OF THE INVENTION

A number of feed systems for gas and liquid phase and fluidized reactors are known to those skilled in the art. Well known systems include systems comprising a catalyst storage vessel connected to a feed chamber with filling and emptying valves in turn connected to a reactor. Typically the catalyst is conveyed from the storage vessel through the catalyst feed system to the reactor by maintaining the reactor at a pressure lower than that in the system. Valves incorporated in such systems allow a given quantity of catalyst to move from the storage vessel to a feed chamber or metering device and then to the reactor.

U.S. Pat. No. 4,610,574 discloses an apparatus comprising an enclosed mixing tank with rotating mixing blades and a rotatable shot valve spaced below the mixing tank. The shot valve can be rotated from a first position in communication with an opening in the lower portion of the mixing tank to a second position in communication with a hydrocarbon feed conduit that provides hydrocarbon liquid to the polymerization reactor vessel. A bypass conduit is provided for introducing hydrocarbon liquid from the hydrocarbon feed conduit into the mixing tank wherein the interior of the mixing tank is maintained at the same pressure as the hydrocarbon feed conduit.

U.S. Pat. No. 4,767,028 discloses a rotating metering valve having a transverse passage which carries a slidable piston reciprocating once for each revolution of the valve for metering particulate material from an inlet port to an outlet port and a purge fluid port in the transverse passage.

U.S. Pat. No. 5,240,683 discloses a devise comprising a storage vessel for a catalyst and a metering valve having a cavity in which the metering valve receives the catalyst powder and is rotated to deliver the catalyst powder to an intermediate chamber having a gas flow to suspend the catalyst prior to discharging the suspended catalyst powder into a pipe with a transverse gas flow to direct the catalyst powder into a reactor vessel.

U.S. Pat. No. 5,851,493 discloses an injection system, for feeding a particulate material into a process vessel, including a valve with at least one cavity for receiving a predetermined volume of particulate material and a sweep stream source for providing a sweep stream having a flow direction generally toward the cavity to remove substantially all of the particulate material from the cavity of the valve.

U.S. Pat. No. 6,319,995 discloses a method of delivering a dry catalyst to a liquid-filled polymerization reactor by transferring dry catalyst from a reservoir to a catalyst chamber and introducing an inert fluid into the chamber to flush the catalyst charge toward the reactor.

Additional references of interest include: U.S. Pat. Nos. 3,012,024; 3,167,398; 3,846,394; 4,123,601; 4,687,381; 4,774,299; 4,773,565; and 5,433,924.

There exists a need for a valve assembly having a filter in the valve passage for use in a particulate material feed system that provides consistent uniform particulate material feed and consistent volume fill efficiency in a chemical process, particularly for use in providing a catalyst in a polymerization process. There exists a need for a valve assembly having a filter in the valve passage for use in a particulate material metering system and/or feed system in which the process of using the filter flushes the particulate material from the filter.

SUMMARY OF THE INVENTION

This invention relates to a valve assembly comprising (a) a valve body defining a valve chamber, an inlet port and a discharge port, wherein the inlet port and discharge port communicate with the valve chamber; and (b) a valve member in the valve chamber, the valve member comprising a passage having (1) a first opening and (2) a second opening surrounding a filter having an inlet surface proximate to the inlet port and a discharge surface proximate to the discharge port, wherein the passage communicates with the inlet port and discharge port, and wherein the valve member is moveable to alternately juxtapose the inlet port and either the filter inlet surface or the filter discharge surface.

This invention relates to a valve assembly comprising a valve body defining a valve chamber, an inlet port and a discharge port, wherein the inlet port and discharge port communicate with the valve chamber; and a valve member in the valve chamber, the valve member comprising a passage having a first passage section and a second passage section separated by a filter having an inlet surface proximate to the inlet port and a discharge surface proximate to the discharge port, wherein the passage communicates with the inlet port and discharge port, and wherein the valve member is moveable to alternately juxtapose the inlet port and either the first passage section or the second passage section.

This invention relates to a method of metering a particulate material, the method comprising (a) providing a first amount of the particulate material in a fluid to a particulate material metering system, the particulate material metering system comprising (1) a valve body defining a valve chamber, an inlet port and a discharge port, wherein the inlet port and discharge port communicate with the valve chamber; and (2) a valve member in the valve chamber, the valve member comprising a passage having a first passage section and a second passage section separated by a filter having an inlet surface proximate to the inlet port and a discharge surface proximate to the discharge port, wherein the passage communicates with the inlet port and discharge port, (b) retaining the first amount of particulate material in the first passage section and discharging the fluid through the filter, the second passage section and the discharge port; (c) juxtaposing the valve member to place the second passage section proximate to and communicating with the inlet port; and (d) providing either (1) a second amount of the particulate material in the fluid to the inlet port and the second passage section and retaining the second amount of the particulate material in the second passage section on the filter and discharging the fluid through the filter which flushes the first amount of particulate material through the first passage section and the discharge port, or (2) a quantity of the fluid to the inlet port and the second passage section that discharges through the filter which flushes the particulate material through the first passage section and the discharge port.

In one embodiment this invention relates to a method of making polyolefin by feeding an olefin and a catalyst to a polyolefin reactor, the method comprising (a) providing a first amount of the catalyst in a fluid to a catalyst metering system, the catalyst metering system comprising (1) a valve body defining a valve chamber, an inlet port and a discharge port, wherein the inlet port and discharge port communicate with the valve chamber; and (2) a valve member in the valve chamber, the valve member comprising a passage having a first passage section and a second passage section separated by a filter having an inlet surface proximate to the inlet port and a discharge surface proximate to the discharge port, wherein the passage communicates with the inlet port and discharge port, (b) retaining the first amount of catalyst in the first passage section on the inlet surface of the filter and discharging the fluid through the second passage section and the discharge port; (c) juxtaposing the valve member to place the second passage section proximate to and communicating with the inlet port; (d) providing either (1) a second amount of the catalyst in the fluid to the inlet port and the second passage section and retaining the second amount of the catalyst in the second passage section and discharging the fluid through the filter which flushes the first amount of catalyst through the first passage section and the discharge port, or (2) a quantity of the fluid to the inlet port and the second passage section that discharges through the filter which flushes the catalyst through the first passage section and the discharge port into a polyolefin reactor; and (e) contacting the catalyst and the olefin in the reactor under conditions sufficient to form the polyolefin.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION

A valve assembly that provides consistent uniform particulate material metering and consistent volume fill efficiency has been developed. A method of using a valve assembly in a particulate material metering system, particularly a catalyst feed system, that provides consistent uniform particulate material feed and consistent volume fill efficiency in a chemical process has been developed. Typically, the particulate metering system is used as a volumetric metering system in which sufficient particulate material in a fluid is provided to essentially fill the first passage 20 with particulate material. Alternatively, a fixed mass of particulate material may retained in the first passage 20 by providing a volume of a fluid having a known mass of particulate material in the fluid with the volume of particulate material being less than or equal to the volumetric capacity of the first passage 20.

Certain embodiments of the valve assembly have a self-cleaning filter in that after a first quantity of a slurry of a particulate material and a fluid are filtered with the particulate material being retained on or proximate to the filter as the fluid is discharged through the filter, the retained particulate material is flushed from the filter as a second quantity of a slurry is filtered from the opposite side of the filter. Alternatively, a quantity of fluid may be discharged through the filter to flush retained particulate material from the surface of the filter and may remove a portion of any particulate material in the pores of the filter. The self-cleaning filter reduces pressure drop across the filter after multiple uses and reduces maintenance required to clean the filter.

Figure 1:
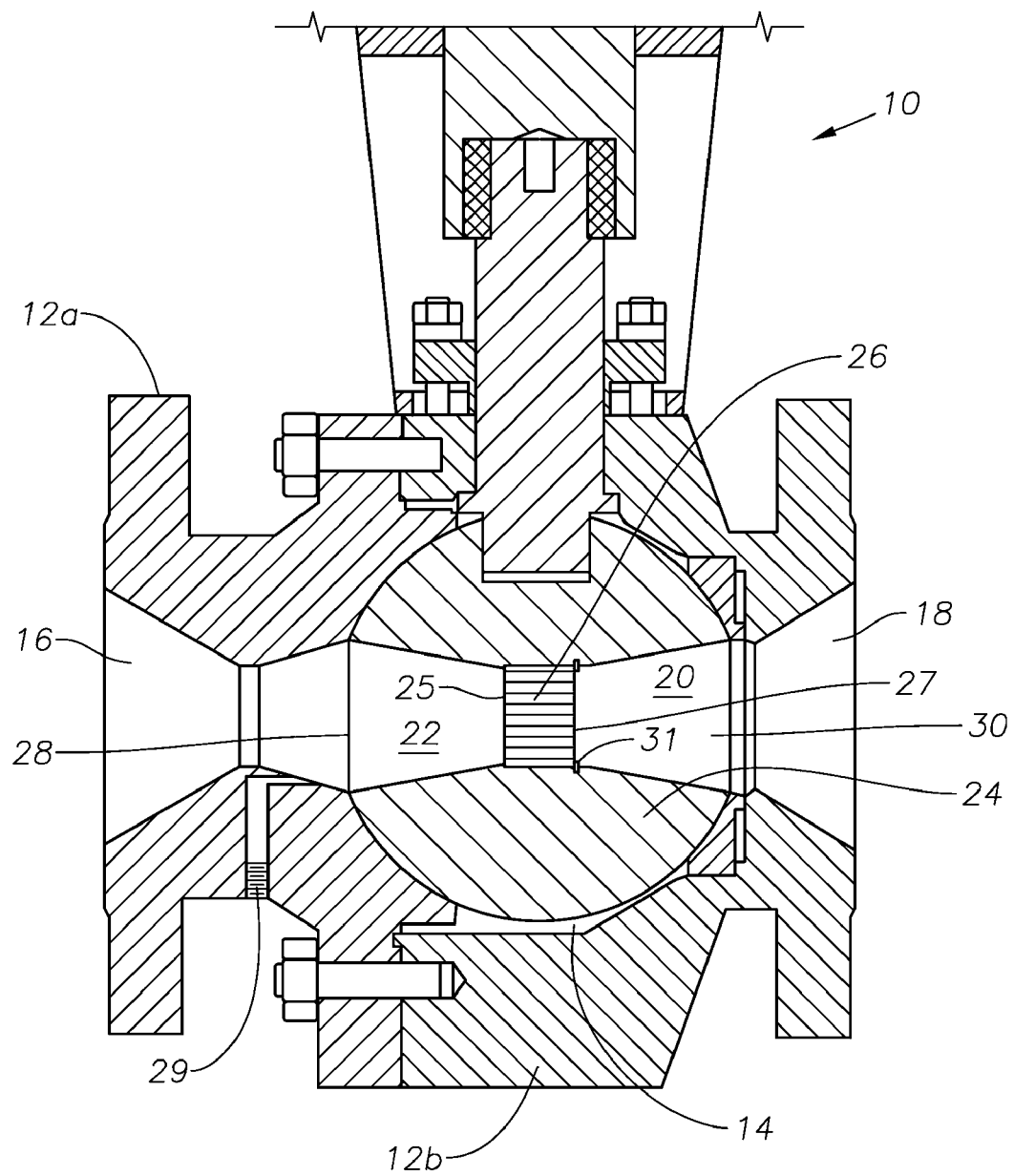
FIG. 1 shows one embodiment of a valve assembly including a ball valve with a filter in the valve passage.

In a preferred embodiment, this invention relates to a valve assembly 10, as shown in FIG. 1, comprising a valve body 12a and 12b, defining a valve chamber 14, an inlet port 18 and a discharge port 16, wherein the inlet port 18 and discharge port 16 communicate with the valve chamber 14; and a valve member 24 in the valve chamber 14, the valve member 24 comprising a passage having a first passage section 20 and a second passage 22 section separated by a filter 26 having an inlet surface 27 proximate to the inlet port 18 and a discharge surface 25 proximate to the discharge port 16, wherein the passage communicates with the inlet port 18 and discharge port 16, and wherein the valve member 24 is moveable to alternately juxtapose the inlet port 18 and either the first passage section 20 or the second passage section 22. The valve member 24 includes, but is not limited to, ball valves and piston valves. In one particularly preferred embodiment, the valve member is substantially spherical, preferably a ball. In one preferred embodiment the valve member 24 is rotatably moveable.

Figure 2:
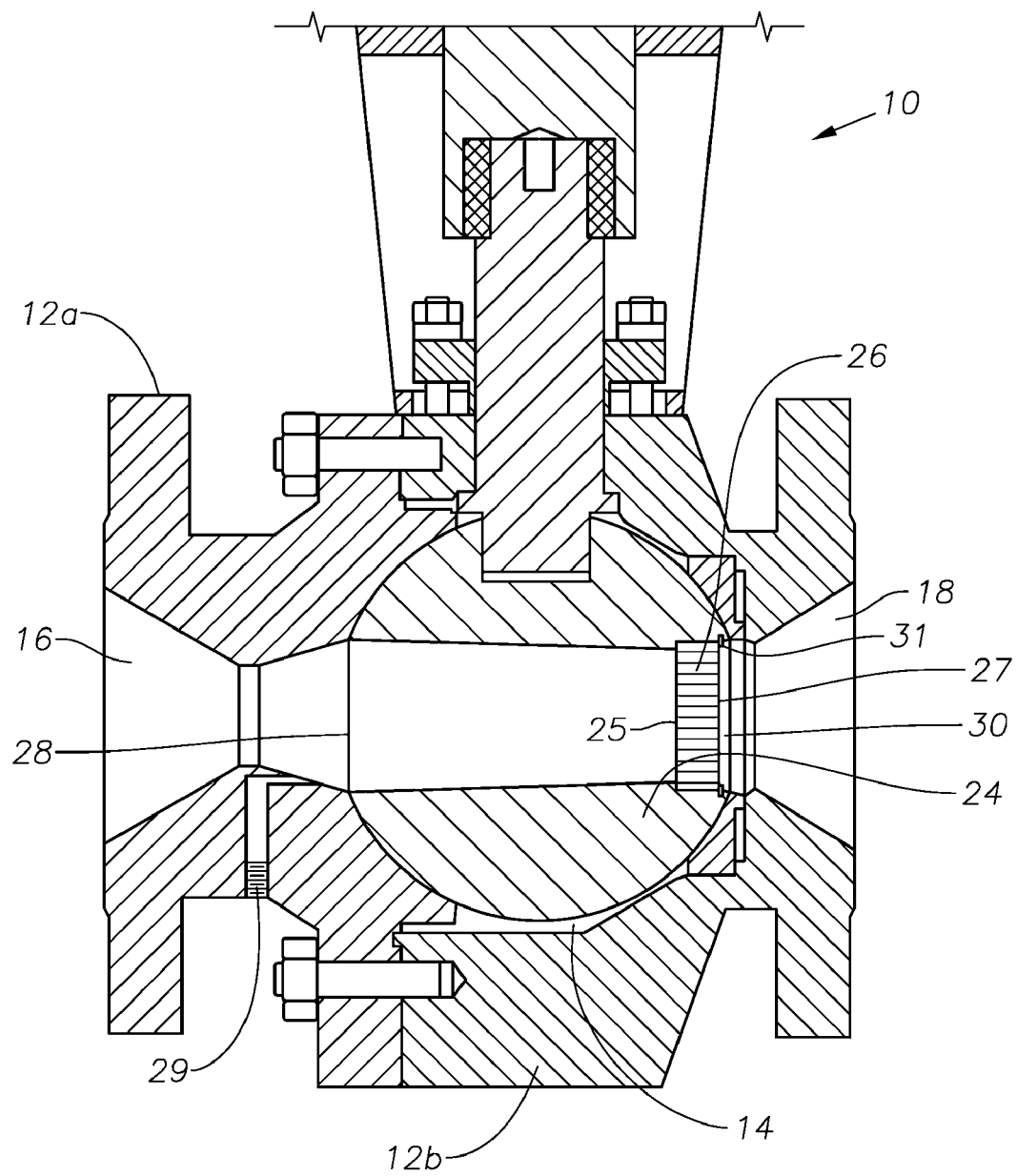
FIG. 2 shows another embodiment of a valve assembly including a ball valve with a filter in the valve passage.

In another embodiment the valve assembly 10 further comprises a flush port 29, as shown in FIGS. 1 and 2. The flush port 29 allows the introduction of a fluid to the discharge surface 25 of the filter in order to flush particulate material from the discharge surface 25 of the filter 26. The introduction of a fluid through the flush port 29 may be in addition to a fluid transiting the filter 26 from the inlet port 18 side of the filter 26 or may be in place of a fluid transiting the filter 26 from the inlet port 18 side of the filter 26.

The valve body 12a and 12b, valve member 24 and filter 26 may be made of any material that is unreactive with the reagents contacting the valve body 12a and 12b, valve member 24 and filter 26. The valve body 12a and 12b, valve member 24 and filter 26 are typically made from a material selected from metal and ceramic, but are not limited to these materials. Non-limiting examples of the metal are carbon steel, nickel alloy such as Hastalloy™, stainless steel, titanium, tungsten carbide coated carbon steel and tungsten carbide coated alloy steel. Preferably the metal for the valve body is tungsten carbide coated carbon steel. Preferably the metal for the valve member is tungsten carbide coated alloy steel.

The filter 26 is typically a sintered metal or ceramic material. The filter is preferably stainless steel. Generally, the pore size of the filter is such that the fluid passes through the filter, but the catalyst is retained on the filter surface. The pore size of the filter is typically selected such that about 99 weight % of the particulate material, preferably about 99.5 weight % and more preferably about 99.9 weight % of the particulate material is retained by the filter. Alternatively, the pore size of the filter is selected such that the cycle time to filter a first quantity of a particulate material, including but not limited to a catalyst, and a fluid followed by discharge of the particulate material during filtration of a second quantity a particulate matter and a fluid is less than or equal to about 10 seconds, preferably less than or equal to about 6 seconds, more preferably less than or equal to about 2 seconds and yet more preferably less than or equal to about 1 second. In one embodiment, the fluid is a liquid and the particulate material and fluid are provided as a slurry. In another embodiment, the fluid is a gas.

The filter 26 may be attached in the valve member passage by any conventional method. The method of attachment includes, but is not limited to, having a threaded groove in the valve member passage and threads on the perimeter of the filter allowing the filter to be screwed into the groove in the valve member passage. Another method of attachment of the filter 26 to the valve member 24 includes having a groove in the valve member passage, an expansion ring 31 engaging the perimeter of the filter wherein the expansion ring is compressed on entering the valve member passage and then expands to secure the filter by engaging the groove in the valve member passage.

In one embodiment, the inlet port 18 and the discharge port 16 are frustoconical. In another embodiment, the inlet port 18 and the discharge port 16 have substantially the same diameter as the filter 26.

FIG. 2 shows another embodiment of a valve assembly 10 including a valve member 24 with a filter 26 in the valve member passage. This alternative embodiment relates to a valve assembly 10 comprising (a) a valve body 12a and 12b defining a valve chamber 14, an inlet port 18 and a discharge port 16, wherein the inlet port 18 and discharge port 16 communicate with the valve chamber 14; and (b) a valve member 24 in the valve chamber 14, the valve comprising a passage having (1) a first opening 28 and (2) a second opening 30 separated by a filter 26 having an inlet surface 27 proximate to the inlet port 18 and a discharge surface 25 proximate to the discharge port 16, wherein the passage communicates with the inlet port 18 and discharge port 16, and wherein the valve member 24 is moveable to alternately juxtapose the inlet port 18 and either the filter inlet surface 27 or the filter discharge surface 25. In one embodiment the valve member 24 is substantially spherical, but other valves member types may be used, for example, a piston. In one preferred embodiment, the valve member 24 is rotatably moveable.

In another embodiment the valve assembly 10 further comprises a flush port 29, as shown in FIG. 2. The flush port 29 allows the introduction of a fluid to the discharge surface 25 of the filter 26 in order to flush particulate material from the discharge surface 25 of the filter 26. The introduction of a fluid through the flush port 29 may be in addition to a fluid transiting the filter 26 from the inlet port 18 side of the filter 26 or may be in place of a fluid transiting the filter 26 from the inlet port 18 side of the filter 26.

One embodiment according to the present invention includes a method of feeding a particulate material in a fluid, the method comprising (a) providing a first amount of the particulate material in the fluid to the particulate material metering system, the particulate material metering system comprising (1) a valve body 12a and 12b defining a valve chamber 14, an inlet port 18 and a discharge port 16, wherein the inlet port 18 and discharge port 16 communicate with the valve chamber 14; and (2) a valve member 24 in the valve chamber 14, the valve member 24 comprising a passage having a first opening 28 and a second opening 30 housing a filter 26 having an inlet surface 27 proximate to the inlet port 18 and a discharge surface 25 proximate to the discharge port 16, wherein the passage communicates with the inlet port 18 and discharge port 16; (b) retaining the first amount of the particulate material in the passage on the inlet surface 27 of the filter 26 and discharging the fluid through the discharge surface 25 of the filter 26 and the discharge port 16; (c) juxtaposing the valve member 24 to place the discharge surface 25 of the filter 26 proximate to and communicating with the inlet port 18; and (d) providing a quantity of the fluid to the inlet port 18 that discharges through the inlet surface 27 of the filter 26 which flushes the particulate material through the discharge port 16. In one embodiment the particulate material comprises one or more of the catalysts, described herein below, for making a polyolefin, for example, polyethylene. Another embodiment of the method further comprises (e) providing a quantity of the fluid through a flush port 29 into the valve passage to flush the particulate material from the discharge surface 25 of the filter 26. Another embodiment of the method comprises an alternate step (d) providing a quantity of the fluid through a flush port 29 into the valve passage to flush the particulate material from the discharge surface 25 of the filter 26.

Figure 3:
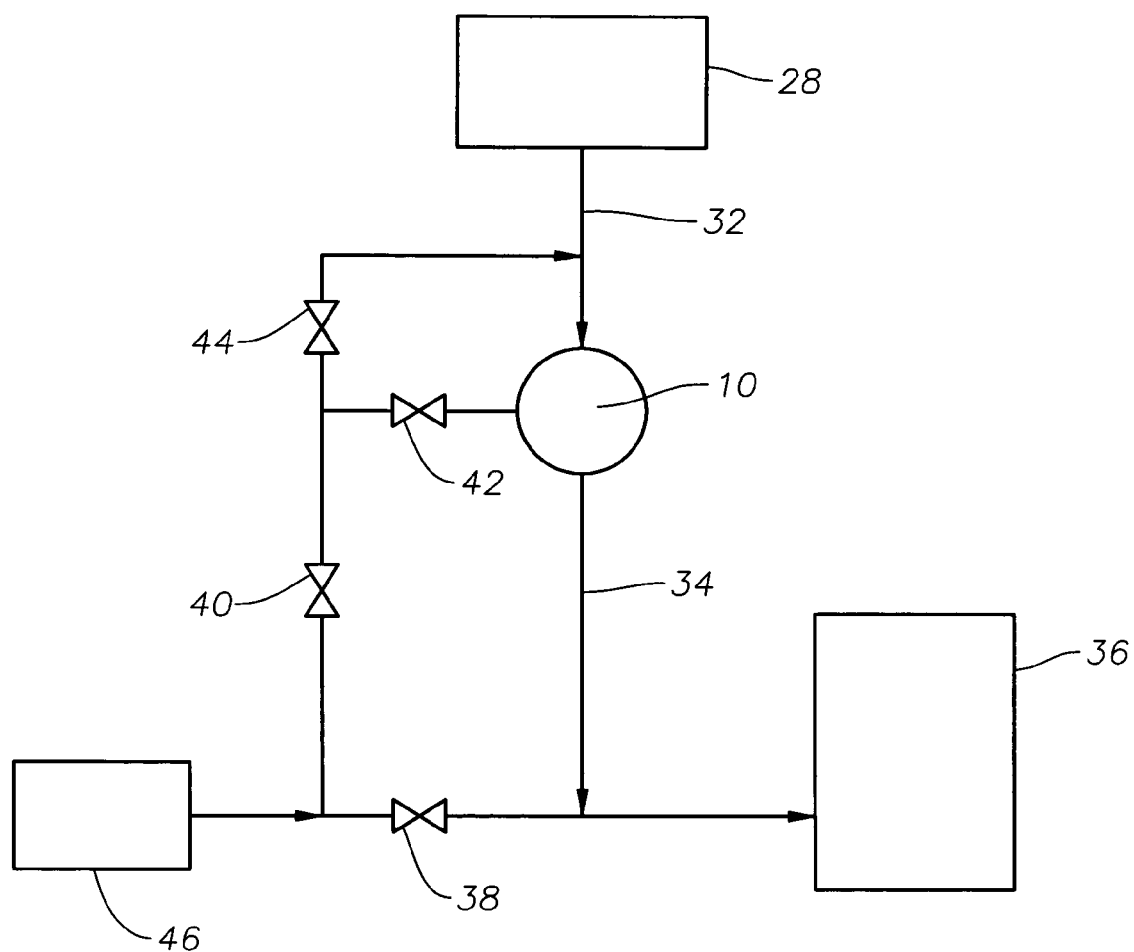
FIG. 3 shows schematically one embodiment of a catalyst feed system in a polymerization process.

FIG. 3 shows one embodiment according to the present invention in which the assembly 10 comprises part of a reactor system. In this embodiment, the assembly 10 receives a catalyst slurry from a catalyst reservoir 28 via a catalyst slurry feed line 32. The catalyst slurry reservoir 28 receives a fluid from a fluid reservoir, not shown. Catalyst slurry feed line 32 communicates with the first inlet port 18, first passage section 20 and the inlet surface 27 of the filter 26 of the valve member 24. The filter 26 retains catalyst on the inlet surface 27 while the fluid transits the filter into the second passage section 22 of the valve member 24. The second passage section 22 of the valve member 24 communicates with the discharge port 16 of the valve member 24. The discharge port 16 communicates with the valve discharge line 34, which communicates with the reactor 36. Alternatively, fluid from the fluid reservoir 46 may be directed through valves 40 and 42 to provide fluid to the flush port 29. Alternatively, fluid from the fluid reservoir 46 may be directed through valves 40 and 44 to provide the fluid to the inlet port 18. Alternatively, a particulate material in a fluid, such as a gas, may be provided from a reservoir corresponding to the catalyst reservoir 28.

In one embodiment according to the present invention, the reactor 36 comprises one or more of a slurry loop reactor, a fluidized bed reactor, a solution reactor, a high pressure reactor or a gas phase reactor. In another embodiment according to the present invention, the reactor 36 comprises at least two reactors, in series or in parallel, selected from a slurry loop reactor, a fluidized bed reactor, a solution reactor, a high pressure reactor or a gas phase reactor.

One embodiment according to the present invention comprises a method of making polyolefin by feeding an olefin and a catalyst to a polyolefin reactor, the method comprising (a) providing a first amount of the catalyst in a fluid to a valve assembly 10, the valve assembly 10 comprising (1) a valve body 12a and 12b defining a valve chamber 14, an inlet port 18 and a discharge port 16, wherein the inlet port 18 and discharge port 16 communicate with the valve chamber 14; and (2) a valve member 24 in the valve chamber 14, the valve member 24 comprising a passage having a first passage section 22 and a second passage section 24 separated by a filter 26 having an inlet surface 27 proximate to the inlet port 18 and a discharge surface 25 proximate to the discharge port 16, wherein the passage communicates with the inlet port 18 and discharge port 16, (b) retaining the first amount of catalyst in the first passage section 20 on the inlet surface 27 of the filter 26 and discharging the fluid through the second passage section 22 and the discharge port 16; (c) juxtaposing the valve member 24 to place the second passage section 22 proximate to and communicating with the inlet port 18; (d) providing either (1) a second amount of the catalyst in the fluid to the inlet port 18 and the second passage section 22 and retaining the second amount of the catalyst in the second passage section 22 on the filter 26 and discharging the fluid through the filter 26 which flushes the first amount of catalyst through the first passage section 20 and the discharge port 16, or (2) a quantity of the fluid to the inlet port 18 and the second passage section 22 that discharges through the filter 26 which flushes the catalyst through the first passage section 20 and the discharge port 16 into a polyolefin reactor 36; and (e) contacting the catalyst and the olefin under conditions sufficient to form the polyolefin. Typically, the catalyst is provided as a slurry with a liquid fluid.

In one embodiment, the olefin is ethylene, propylene, a butene, a pentene, a hexene, a heptene, an octene, a nonene, a decene, an undecene, a duodecene, a tridecene, a tetradecene, a pentadecene or a mixture thereof. In one preferred embodiment, the olefin is ethylene and the polyolefin is polyethylene. In another embodiment the olefin is a mixture of ethylene and at least one alpha-olefin comonomer, such as a $C_3$-$C_{20}$ alpha-olefin, preferably a $C_3$-$C_{12}$ alpha-olefin. The polyethylene comprises at least one of a low density polyethylene, a linear low density polyethylene, a medium density polyethylene, a high density polyethylene or a very low density polyethylene.

The catalyst comprises one or more of a Ziegler-Natta catalyst, a metallocene catalyst, a single site catalyst, a chrome catalyst or a mixture thereof. The catalyst may be supported or unsupported. Typical supports include inorganic oxides and chlorides, for example, silica and alumina and organic resins such as polyethylene.

The fluid used for the slurry of catalyst and fluid may be any fluid that is inert to the catalyst. Suitable fluids include gases and liquids. Non-limiting examples of the fluid are propane, isobutane, n-pentane, iso-pentane, neopentane and hexane.

The following definitions are useful in understanding the present invention.

Various types of polyethylenes are known in the art. Low density polyethylene ("LDPE") can be prepared at high pressure using free radical initiators and typically has a density in the range of 0.916-0.940 $g/cm^3$. LDPE is also known as "branched" or "heterogeneously branched" polyethylene because of the relatively large number of long chain branches extending from the main polymer backbone. Polyethylene in the same density range, i.e., 0.916 to 0.940 $g/cm^3$, which is linear and does not contain large quantities of long chain branching is also known; this "linear low density polyethylene" ("LLDPE") can be produced with conventional Ziegler-Natta catalysts or with single site catalysts, such as metallocene catalysts, discussed further below. Relatively higher density LDPE or LLDPE, typically in the range of 0.928 to 0.940 $g/cm^3$ are sometimes referred to as medium density polyethylene ("MDPE") or Linear Medium Density Polyethylene ("LMDPE"). Polyethylenes having still greater density are the high density polyethylenes ("HDPEs"), i.e., polyethylenes having densities greater than 0.940 $g/cm^3$, and are generally prepared with Ziegler-Natta catalysts, chrome catalysts or even single site catalysts such as metallocene catalysts. Very low density polyethylene ("VLDPE") is also known. VLDPEs can be produced by a number of different processes yielding polymers with different properties, but can be generally described as polyethylenes having a density less than 0.916 $g/cm^3$, typically 0.890 to 0.915 $g/cm^3$ or 0.900 to 0.915 $g/cm^3$. VLDPEs produced using metallocene or other single-site catalysts, as discussed further below, are referred to as a type of plastomer. Plastomers having a density as low as 0.860 $g/cm^3$ are commercially available. Polyethylenes produced using metallocene catalysts are conventionally referred to using the prefix "m" before one of the above designations, depending on density, e.g., mLLDPE or mVLDPE. The densities above are those measured using ASTM D-1505.

A "metallocene polyethylene" as used herein means a polyethylene produced by a metallocene catalyst. As used herein, the term "metallocene catalyst" is defined to be at least one metallocene catalyst component containing one or more substituted or unsubstituted cyclopentadienyl moiety (Cp) in combination with a Group 4, 5, or 6 transition metal (M), and generally with an activator of alumoxane (e.g., MAO) and/or a non-coordinating anion in solution, slurry, high pressure, or gas phase. The catalyst and activator may be, independently, supported or unsupported, with the support, when present, typically an inorganic oxide or chloride or a resinous material such as polyethylene.

The prior art discloses examples of metallocene catalysts/ systems for producing metallocene polyethylene. Non-limiting examples of metallocene catalysts and catalyst systems useful in practicing the present invention include WO 96/11961; WO 96/11960; U.S. Pat. Nos. 4,808,561; 5,017,714; 5,055,438; 5,064,802; 5,124,418; 5,153,157; 5,324,800; more recent examples are U.S. Pat. Nos. 6,380,122; and 6,376,410; and WO01/98409, EP 0 963 409, and references cited therein.

Included within the definition of the "metallocene polyethylene" useful in the present invention are polyethylene resins having a low polydispersity as described, for instance, in U.S. Pat. No. 6,492,010, that is, a polydispersity produced by a catalyst variously described as "single site", "constrained geometry", or the aforementioned metallocene catalyst, catalysts per se well known in the prior art.

Metallocene or low polydispersity resins useful in the present invention are available from, among others, Dow Chemical Company and Exxon Chemical Company who are producers of single site or constrained geometry catalyzed polyethylenes. These resins are commercially available as the ENHANCED POLYETHYLENE™, ELITE™, AFFINITY™, EXXACT™, and EXCEED™ polyethylene resins. TAFMER™ resins, available from Mitsui Chemical Company and also having low polydispersity, and having a density within the aforementioned range for LLDPE and VLDPEs, are also useful in present invention, and are included within the definition of the term "metallocene polyethylene" for the purposes of the present invention.

Also useful in the present invention and included within the definition of metallocene polyethylenes useful in the present invention are bimodal resins produced by catalysts having as at least one component a metallocene polyethylene. Particularly preferred examples are bimodal resins having as a component a resin produced using a single site, constrained geometry, or metallocene catalyst and having a density falling within the density range for LLDPE and VLDPE as previously described. Bimodal resins are per se well known in the art.

Polyethylene generally may also be characterized as homopolymers or copolymers of ethylene. Polymers having more than two types of monomers, such as terpolymers, are also included within the term "copolymer" as used herein.

The comonomers that are useful in the present invention include alpha-olefins, such as $C_3$-$C_{20}$ alpha-olefin and preferably $C_3$-$C_{12}$ alpha-olefins. The alpha-olefin comonomer can be linear or branched, and two or more comonomers can be used, if desired. Examples of suitable comonomers include linear $C_3$-$C_{12}$ alpha-olefins, and alpha-olefins having one or more $C_1$-$C_3$ alkyl branches, or an aryl group. Specific examples include propylene; 3-methyl-1-butene; 3,3-dimethyl-1-butene; 1-pentene; 1-butene; 1-pentene with one or more methyl, ethyl or propyl substituents; 1-hexene; 1-hexene with one or more methyl, ethyl or propyl substituents; 1-heptene with one or more methyl, ethyl or propyl substituents; 1-decene; 1-dodecene; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A method of feeding a measured amount of particulate material, the method comprising:
   (a) providing a first amount of the particulate material in a fluid to form a slurry, and feeding the slurry to a particulate material metering system, wherein the particulate material comprises a catalyst selected from a Ziegler-Natta catalyst, a metallocene catalyst, a single site catalyst, a chrome catalyst, a supported Ziegler Natta catalyst, a supported metallocene catalyst, a supported single site catalyst, a supported chrome catalyst or a combination thereof, the particulate material metering system comprising:
      (1) a valve body defining a valve chamber, an inlet port and a discharge port, wherein the inlet port and discharge port communicate with the valve chamber; and
      (2) a substantially spherical valve member in the valve chamber, the valve member comprising a passage having a first frustoconical passage section and a second frustoconical passage section separated by a filter and within said passage and having an inlet surface proximate to the inlet port and a discharge surface proximate to the discharge port, wherein the passage extends through the valve member from the inlet port to the discharge port;
   (b) retaining the first amount of the particulate material in the first frustoconical passage section and discharging the fluid through the filter through the second frustoconical passage section and the discharge port;
   (c) repeatedly juxtaposing the valve member to place the second frustoconical passage proximate to and communicating with the inlet port; and
   (d) providing either
      (1) a second amount of the particulate material in the fluid to the inlet port and the second frustoconical passage section and retaining the second amount of the particulate material in the second frustoconical passage section on the filter and discharging the fluid through the filter which flushes the first amount of particulate material through the first frustoconical passage section and the discharge port, or
      (2) a quantity of the fluid to the inlet port and the second frustoconical passage section that discharges through the filter which flushes the particulate material through the first frustoconical passage section and the discharge port; and/or
      (3) introducing a quantity of fluid through a flush port within the valve body located adjacent to and directed at the discharge surface to allow the introduction of a fluid to the discharge surface of the filter;
   wherein said valve member is repeatedly juxtaposed at intervals of less than about 10 seconds.

2. The method according to claim 1, wherein the valve member is rotatably moveable.

3. The method according to claim 1, wherein the filter, the valve member and the valve body are each independently constructed from a material selected from a metal and a ceramic material.

4. The method according to claim 3, wherein the valve member is constructed from a metal selected from stainless steel, titanium, tungsten carbide coated stainless steel and tungsten carbide coated titanium.

5. The method according to claim 4, wherein the filter is constructed from sintered stainless steel.

6. The method of claim 1, wherein the particulate material is retained on the inlet surface of the filter and the fluid exits the passage through the discharge surface of the filter.

7. The method of claim 1, wherein a quantity of the fluid transits from the discharge surface of the filter through the inlet surface of the filter and flushes the particulate material from the inlet surface of the filter.

8. A method of feeding a measured amount of particulate material, the method comprising:
   (a) providing a first amount of the particulate material in a fluid to form a slurry, and feeding the slurry to a particulate material metering system, wherein the fluid comprises one or more of propane, isobutene, n-pentane, iso-pentane, neopentane and hexane, the particulate material metering system comprising:
      (1) a valve body defining a valve chamber, an inlet port and a discharge port, wherein the inlet port and discharge port communicate with the valve chamber; and
      (2) a substantially spherical valve member in the valve chamber, the valve member comprising a passage having a first frustoconical passage section and a second frustoconical passage section separated by a filter and within said passage and having an inlet surface proximate to the inlet port and a discharge surface proximate to the discharge port, wherein the passage extends through the valve member from the inlet port to the discharge port;
   (b) retaining the first amount of the particulate material in the first frustoconical passage section and discharging the fluid through the filter through the second frustoconical passage section and the discharge port;
   (c) repeatedly juxtaposing the valve member to place the second frustoconical passage proximate to and communicating with the inlet port; and
   (d) providing either
      (1) a second amount of the particulate material in the fluid to the inlet port and the second frustoconical passage section and retaining the second amount of the particulate material in the second frustoconical passage section on the filter and discharging the fluid through the filter which flushes the first amount of particulate material through the first frustoconical passage section and the discharge port, or
      (2) a quantity of the fluid to the inlet port and the second frustoconical passage section that discharges through the filter which flushes the particulate material through the first frustoconical passage section and the discharge port; and/or
      (3) introducing a quantity of fluid through a flush port within the valve body located adjacent to and directed at the discharge surface to allow the introduction of a fluid to the discharge surface of the filter;
   wherein said valve member is repeatedly juxtaposed at intervals of less than about 10 seconds.

* * * * *